Jan. 5, 1937.  E. BLAMBERG  2,066,760
SELF STARTING, STOPPING REVERSIBLE SYNCHRONOUS MOTOR
Filed May 23, 1933
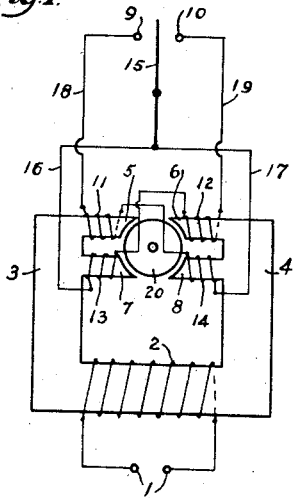
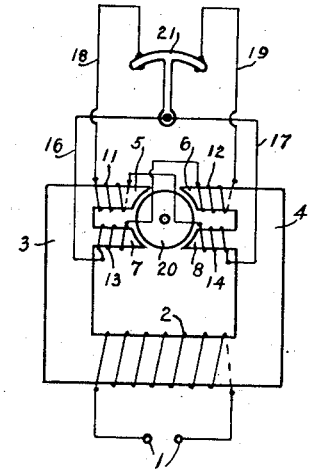
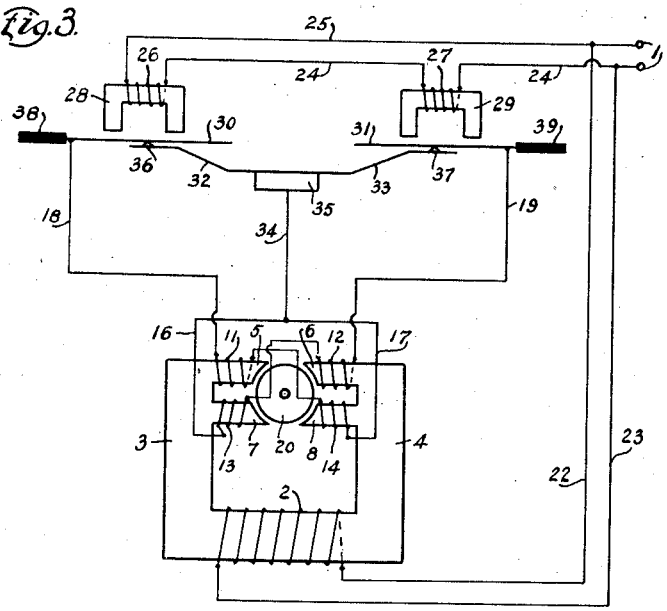
INVENTOR-
*Ernst Blamberg;*
BY
*Harold D. Penney,* ATTORNEY- Patented Jan. 5, 1937

2,066,760

UNITED STATES PATENT OFFICE 2,066,760

SELF STARTING, STOPPING REVERSIBLE SYNCHRONOUS MOTOR

Ernst Blamberg, Frankfort-on-the-Main, Germany, assignor to Hartmann & Braun Aktiengesellschaft, Frankfort-on-the-Main, Germany, a corporation of Germany Application May 23, 1933, Serial No. 672,372
In Germany June 28, 1932

5 Claims. (Cl. 172—179)

The present invention relates to miniature synchronous electric motors of the self starting type, for use in the control of measuring instruments, and has for its important feature, the provision, in such a motor, of means for self starting the rotor, stopping the same and causing the rotor to self start in reverse directions, as desired.

A further object is to provide means on such a motor, whereby the alternating field of the stator may be changed into a reversible Ferraris or rotating field for rotor starting purposes, with novel means for causing such rotor starting, reversing and stopping by current fluctuations in the current supply line.

The structure herein is somewhat related to my United States Patent No. 1,970,162, patented Aug. 14, 1934, which discloses a reversible synchronous motor and apparatus driven thereby.

Further advantages will be noted as the herein description proceeds and it is obvious that modifications may be made in the herein disclosed device without departing from the spirit hereof or the scope of the appended claims.

In the drawing accompanying,

Fig. 1 is a diagrammatic layout of a synchronous motor the two poles of which are split into two sub-divisions each and are wound with short circuitable coils in opposed group pairs with means for causing the rotor to start and rotate in one or an opposite direction;

Fig. 2 is a diagrammatic layout of a structure similar to Fig. 1, except that the means for causing the rotor to self start and rotate in one or the other direction, includes means to stop the rotor by short circuiting all of the stator pole coils simultaneously; and Fig. 3 is a diagrammatic layout of another form of synchronous motor and circuit of the foregoing described type in which fluctuations or stability of the line current automatically cause the rotor to stop, start and reverse in accordance with such fluctuations or non-fluctuations.

In Fig. 1 there is disclosed one form of self starting synchronous motor in which the coil 2 of the alternating current magnet 3—4 energizes said magnet, the alternating current being supplied from a suitable source, not shown, to contacts 1. The stator pole ends of the magnet 3—4 are both split, and thereby provide sub-pole ends 5, 6, 7 and 8. These sub-pole ends are each separately wrapped with a short circuit winding, 11, 12, 13 and 14, respectively. The diagonally opposite coils 11 and 14 are interconnected and the diagonally opposite coils 12 and 13 are likewise interconnected and the terminal ends 16—17 or coils 13 and 14 are commonly joined and connected to a switch blade 15.

The terminal ends 18 and 19, of coils 11 and 12, are connected to spaced switch contacts 9 and 10 respectively and these contacts are served by switch 15.

By use of the switch 15, contact thereof with contact 9 short circuits coils 11 and 14 and thus cause the rotor 20 to start and to rotate in a clock-wise direction. When the switch 15 is closed with contact 10, the rotor 20 will be caused to start and to rotate in an anti-clock-wise direction. When the switch 15 is left in neutral or open position as in Fig. 1, the rotor 20 comes to an immediate stop.

It has further been found that the rotor 20 will also be stopped when all of the coils 11, 12, 13 and 14 are simultaneously short circuited, and to this end, as in Fig. 2, wherein similar indices indicate the same parts and functions, as described for Fig. 1, another form of switch 15, having a radial, segmental contacting head 21, which when rocked from one side to another may cut out both contacts 9 and 10, cut out one contact and cut in the other, and cut in both contacts 9 and 10, and thus, by moving the segment switch to clear one or the other contacts, or both, that the rotor 20 may be caused to start in either direction and run, or be stopped by the simultaneous short circuiting of all of the coils 11, 12, 13 and 14, and in this sense is in reality useful in operations where a closed circuit operation is desirable, in contradistinction to the open circuit type disclosed in Fig. 1.

A further embodiment and amplification of the foregoing last described short circuit brake and rotation control is diagrammatically shown in Fig. 3, where, again similar indices are utilized for the same parts and functions as in Figs. 1 and 2, wherein fluctuations of the line current will cause varied control of the rotor movements. As in Figs. 1 and 2, the synchronous motor and connections are the same, but a difference in the arrangement of the switching control for the rotor 20 is provided. The magnet coil 2 is energized from an alternating current source, not shown, from contacts 1 by wiring 22—23.

From this same point 1, a pair of conductors 24—25 form a return circuit. In this same circuit is located a pair of energized magnets 28—29, there being energized by the windings or coils 26—27 connected in series in line 24.

Below each of the poles of the two magnets 28—29 is mounted, in suitable stationary standards 38—39, two vibrating switch blades 30 and 31 respectively. When these vibrating switch blades are uninfluenced by action of the magnets, they lie in their normal planes, as in Fig. 3, and are thus in contact with the contact points 36—37 on the conducting support arms 32—33, which in turn are held in a conductive support 35, this in turn being connected to conductor 34, and this in turn being connected to coil terminals 16—17 of short circuit coils 13 and 14.

The vibrating blades of the fixed insulating supports 38—39 are conductively connected to the coil terminals of short-circuiting coils 12 and 13 by conductors 18 and 19, respectively.

The vibrating switch blades 30—31 are thereafter tuned, i. e. by any suitable means, such as, for instance, shortening or lengthening their operative lengths, reed-like, so that, in a 60 cycle alternating current, vibrator 30 would be tuned to a frequency of 59 cycles, and thus if the alternating current dropped one cycle, the blade 30 would vibrate. The other vibrating blade 31 would be tuned to a frequency of 61 cycles, or one cycle over normal current frequency and two cycles higher than blade 30, and thus, blade 31 would vibrate if the current source varied upwardly 1 cycle, and break the contact with its connection 37. If either blade vibrates, the other blade remains stationary, and such vibration of either blade can only occur when the 60 cycle current undergoes one cycle increase or decrease.

If the 60 cycle current remains stable, neither blade vibrates and both remain in closed contact position, as in Fig. 3, thus short circuiting all four pole coils 11, 12, 13 and 14, and the rotor remains stationary. As previously outlined, the rotor will start and operate in the direction of rotation controlled by that operative blade, while the non-operative blade short circuits the pole coils under its control.

The rotor 20 may easily be connected to actuate a regulating means, release a single or initiate other indications of frequency variation, as desired. Such rotor actuated means may consist of the provision, also, by way of suggestion, the sending of a signal due to the breaking of a line or opening of a contact. Use of this nature is outlined in the foregoing noted pending United States patent application.

It will thus be noted that the stopping, starting and automatic reversal of the rotor is completely controlled entirely by the aid of the short circuitable coils, and that they, in turn, may be influenced by frequency changes in the main line supply, or by manual control.

What I claim is:

1. In combination, an intermittent current circuit; magnetic means influenced thereby to produce intermittent magnetism; vibratory means influenced by the magnetism and tuned to vibrate when the frequency of the magnetism is at one rate, said means adapted to remain stationary when the frequency is at another rate; an alternating current motor driven by current from said circuit at either frequency; and means influenced by said vibratory means to cause the motor to change its operation.

2. In combination, alternating circuit of a given frequency, magnetic means influenced by the current to give magnetism of said frequency; a pair of switches each having a vibratory element influenced by said magnetism; said element being tuned to be vibrated by said magnetism when just above and just below said frequency respectively to operate the switch, a motor comprising a rotor, and a stator, a pole of the stator being split to form forward and rear cores; an exciting coil for the stator connected in said circuit; a shading coil on each core; and conductors connecting the coils in series with the respective switches.

3. In combination, a source of alternating current of a normal frequency rate; magnets influenced by said current; vibratory elements influenced by the magnets and tuned respectively to vibrate only when the frequency is raised or lowered from normal; a motor driven by current from said source; and a pair of means respectively influenced by said elements when only one of the latter vibrates to cause the motor to run forward or backwardly and to stop when neither element vibrates, whereby said current source while alternating may have the triple function of stopping the motor, when the frequency is normal running the motor backwardly or running the motor forwardly.

4. In combination, an alternating current circuit for alternating current of a certain normal frequency adapted to vary above or below normal; a pair of magnets excited by said current; a switch associated with each magnet, each switch having a switch element constituting a vibratory member in the field of the magnet; said members being tuned respectively just above and below said frequency, so that if the frequency is raised or lowered, one or the other vibratory member is vibrated and the switch operated; a motor comprising a rotor, a single-phase stator comprising poles each comprising split cores, alternating current exciter windings for said poles connected to said circuit; a forward and a rear shading coil on each of said cores; and conductors connecting like shading coils in series with the respective switches.

5. In combination, an alternating current circuit for alternating current of a certain normal frequency adapted to vary above or below normal; a pair of magnets; controlled by said circuit and current for exciting said magnets to alternate their flux with said frequency; a normally closed switch associated with each magnet, each switch having a switch element constituting a vibratory member in the field of the magnet; said members being tuned respectively just above and below said frequency, so that if the frequency is normal neither member vibrates, and if the frequency is raised or lowered, one or the other vibratory member only is vibrated and the switch thereby opened; a motor comprising a rotor, a single-phase stator comprising poles each comprising split cores, alternating current exciter windings for said poles connected in said circuit; forward and rear shading coils, on each of said cores respectively; and conductors connecting like shading coils in series with the respective switches whereby when the switches are selectively opened one at a time, the motor is caused to rotate in respectively opposite directions and when both switches are automatically closed by normal frequency, the motor is stopped while the current source that stopped it is still connected to the exciter windings.

ERNST BLAMBERG.